(12) United States Patent
Kubota

(10) Patent No.: US 10,136,025 B2
(45) Date of Patent: Nov. 20, 2018

(54) IMAGE PROCESSING APPARATUS CAPABLE OF GENERATING IMAGE, METHOD OF CONTROLLING THE SAME, AND STORAGE MEDIUM

(71) Applicant: CANON KABUSHIKI KAISHA, Tokyo (JP)

(72) Inventor: Tomohide Kubota, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/260,485

(22) Filed: Sep. 9, 2016

(65) Prior Publication Data

US 2017/0078525 A1    Mar. 16, 2017

(30) Foreign Application Priority Data

Sep. 16, 2015   (JP) .................................. 2015-182803
Mar. 17, 2016   (JP) .................................. 2016-053814

(51) Int. Cl.
    *H04N 1/387*     (2006.01)
    *H04N 1/00*     (2006.01)

(52) U.S. Cl.
    CPC ......... *H04N 1/3877* (2013.01); *H04N 1/0044* (2013.01); *H04N 1/00639* (2013.01); *H04N 1/3872* (2013.01)

(58) Field of Classification Search
    CPC ............. H04N 1/3877; H04N 1/00639; H04N 1/0044; H04N 1/3872
    See application file for complete search history.

(56) References Cited

U.S. PATENT DOCUMENTS

2007/0216973 A1\*    9/2007    Tagawa .............. G03G 15/6541
    358/527
2013/0329249 A1\*    12/2013    Naya .................... G06K 15/005
    358/1.15

FOREIGN PATENT DOCUMENTS

JP      2006099714 A      4/2006
JP      2014130430 A      7/2014

\* cited by examiner

*Primary Examiner* — Iriana Cruz
(74) *Attorney, Agent, or Firm* — Rossi, Kimms & McDowell LLP

(57) ABSTRACT

An image processing apparatus capable of generating printed matter desired by a user. An MFP as the image processing apparatus generates or changes print data for printing print contents on a recording sheet to generate printed matter. Print data including information on pages is acquired from an external apparatus. Information designating ones of the pages, which are to be rotated through 180 degrees, is acquired. Based on the print data, image data for a surface of a sheet is generated by arranging two or more pages on the surface of the sheet. If a page is not to be rotated through 180 degrees, image data is generated by arranging the pages in a predetermined layout, whereas if all pages are to be rotated through 180 degrees, image data is generated by arranging the pages in a different layout from the predetermined layout.

17 Claims, 12 Drawing Sheets

*FIG. 3C*

| DOCUMENT NAME 311 | DOUBLE-SIDE/ SINGLE-SIDE 312 | AGGREGATED PAGE COUNT 313 | ARRANGEMENT ORDER 314 | STAPLING/ PUNCHING 315 | BINDING MARGIN 316 |
|---|---|---|---|---|---|
| DOCUMENT 1.pptx | SINGLE-SIDE | 1in1 | - | - | - |
| DOCUMENT 2.xlsx | DOUBLE-SIDE | 1in1 | - | - | LONG SIDE 50 mm |
| DOCUMENT 3.docx | SINGLE-SIDE | 2in1 | FROM LEFT TO RIGHT | UPPER LEFT | - |
| ... | ... | ... | ... | ... | ... |
| DOCUMENT N.docx | SINGLE-SIDE | 4in1 | DOWN FROM UPPER LEFT | - | - |

| DOCUMENT NAME | DOUBLE-SIDE/ SINGLE-SIDE | AGGREGATED PAGE COUNT | ARRANGEMENT ORDER | STAPLING/ PUNCHING | BINDING MARGIN |
|---|---|---|---|---|---|
| DOCUMENT 1.pptx | DOUBLE-SIDE | 4in1 | FROM LOWER RIGHT TO LEFT | LOWER RIGHT | LONG SIDE -50mm |

314, 315, 316

Layout preview:
- -1- abcd
- -2- efgh
- -3- ijkl
- -4- mnop

IMAGE PROCESSING APPARATUS CAPABLE OF GENERATING IMAGE, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium, and more particularly to an image processing apparatus capable of generating an image such that printed matter as desired by a user is obtained, a method of controlling the same, and a storage medium.

Description of the Related Art

There has been known an MFP as an image processing apparatus that acquires print data, and performs print processing based on the acquired print data. The MFP performs normal printing in which when print data is acquired, print processing is immediately performed based on the acquired print data, and reservation printing in which even when print data is acquired, execution of print processing based on the acquired print data is reserved until an instruction for executing print processing is received from a user. In reservation printing, print data is temporarily stored in the MFP after the print data is associated with a user who has instructed generation of the print data, and the MFP performs user authentication based on input information input by an operation of a console section provided on the MFP. If the user authentication is successful, the MFP performs print processing based on the print data associated with the user who has succeeded in user authentication (hereinafter referred to as the "authenticated user") out of stored print data (see e.g. Japanese Patent Laid-Open Publication No. 2006-99714).

Further, print data is generated e.g. by a client PC as an image processing apparatus. The client PC generates print data based on various kinds of setting information set by a user, such as the order of printing pages, and setting information of Nin1 printing for performing printing in which a plurality of pages of print contents are printed in an aggregated manner on one recording sheet (see e.g. Japanese Patent Laid-Open Publication No. 2014-130430).

Incidentally, the MFP sometimes acquires inverted print data to be printed in a direction not desired by a user, such as a direction inverted by 180 degrees. In this case, the MFP performs 180-degree rotation print processing in which the print data is printed by rotating the print contents of the inverted print data through 180 degrees according to an instruction from a user. This is also the same with a case of printing in Nin1, and in this case, print processing is performed by rotating inverted pages through 180 degrees, and then laying out a plurality of pages for one sheet. This enables the MFP to perform printing of print contents in a direction desired by the user even when the inverted print data is acquired.

However, in Nin1 printing, if the above-described method of generating an image after inverting the pages is employed, image generation processing takes much time, causing the user to wait.

SUMMARY OF THE INVENTION

The present invention provides an image processing apparatus that, even when Nin1 printing is performed using inverted print data, is capable of generating an image, such that printed matter as desired by a user is obtained, while reducing load on image generation to thereby reduce waiting time of the user.

In a first aspect of the invention, there is provided an image processing apparatus for use in a system including an image forming section that forms an image on a sheet, comprising a control unit including at least one memory storing a program and at least one processor that executes the program, the control unit being configured to perform processing for acquiring print data including information on a plurality of pages, from an external apparatus, processing for acquiring information designating pages that are to be rotated through 180 degrees, out of the plurality of pages, generation processing for generating, based on the print data, image data including an image for arranging two or more plurality of pages on one surface of a sheet, and processing for causing the image forming section to perform image formation based on the generated image data, wherein in the generation processing, in a case where at least one of the plurality of pages to be arranged on the one surface of the sheet is not a page to be rotated through 180 degrees, the control unit generates an image by arranging the page in a predetermined layout, whereas in a case where all of the plurality of pages to be arranged on the one surface of the sheet are pages to be rotated through 180 degrees, the control unit generates an image by arranging the pages in a layout different in relative positional relationship between the pages from the predetermined layout.

In a second aspect of the invention, there is provided a method of controlling an image processing apparatus for use in a system including an image forming section that forms an image on a sheet, comprising acquiring print data including information on a plurality of pages, from an external apparatus, acquiring information designating pages that are to be rotated through 180 degrees, out of the plurality of pages, generating, based on the print data, image data including an image for arranging two or more plurality of pages on one surface of a sheet, and causing the image forming section to perform image formation based on the generated image data, wherein said generating includes, generating, in a case where at least one of the plurality of pages to be arranged on the one surface of the sheet is not a page to be rotated through 180 degrees, an image by arranging the page in a predetermined layout, whereas generating, in a case where all of the plurality of pages to be arranged on the one surface of the sheet are pages to be rotated through 180 degrees, an image by arranging the pages in a layout different in relative positional relationship between the pages from the predetermined layout.

In a third aspect of the invention, there is provided a non-transitory computer-readable storage medium storing a computer-executable program for executing a method of controlling an image processing apparatus for use in a system including an image forming section that forms an image on a sheet, wherein the method comprises acquiring print data including information on a plurality of pages, from an external apparatus, acquiring information designating pages that are to be rotated through 180 degrees, out of the plurality of pages, generating, based on the print data, image data including an image for arranging two or more plurality of pages on one surface of a sheet, and causing the image forming section to perform image formation based on the generated image data, wherein said generating includes, generating, in a case where at least one of the plurality of pages to be arranged on the one surface of the sheet is not a page to be rotated through 180 degrees, an image by arranging the page in a predetermined layout, whereas generating, in a case where all of the plurality of pages to be arranged on the one surface of the sheet are pages to be rotated through 180 degrees, an image by arranging the pages in a layout different in relative positional relationship between the pages from the predetermined layout.

According to the present invention, it is possible to generate printed matter desired by a user, while reducing waiting time of the user.

Further features of the present invention will become apparent from the following description of exemplary embodiments (with reference to the attached drawings).

BRIEF DESCRIPTION OF THE DRAWINGS

FIG. 3C is a diagram showing an example of a print data list generated by the print data list generation process.

FIG. 7C is a diagram showing an example of the print data list after changing the layout information.

DESCRIPTION OF THE EMBODIMENTS

The present invention will now be described in detail below with reference to the accompanying drawings showing embodiments thereof.

Although in the present embodiment, a description will be given of a case where the present invention is applied to an MFP as an image processing apparatus, the present invention is not limitedly applied to the MFP. For example, the present invention can be applied to any suitable image processing apparatus capable of communicating print data, including a SFP (Single Function Printer) or a LBP (Laser Beam Printer).

Figure 1:
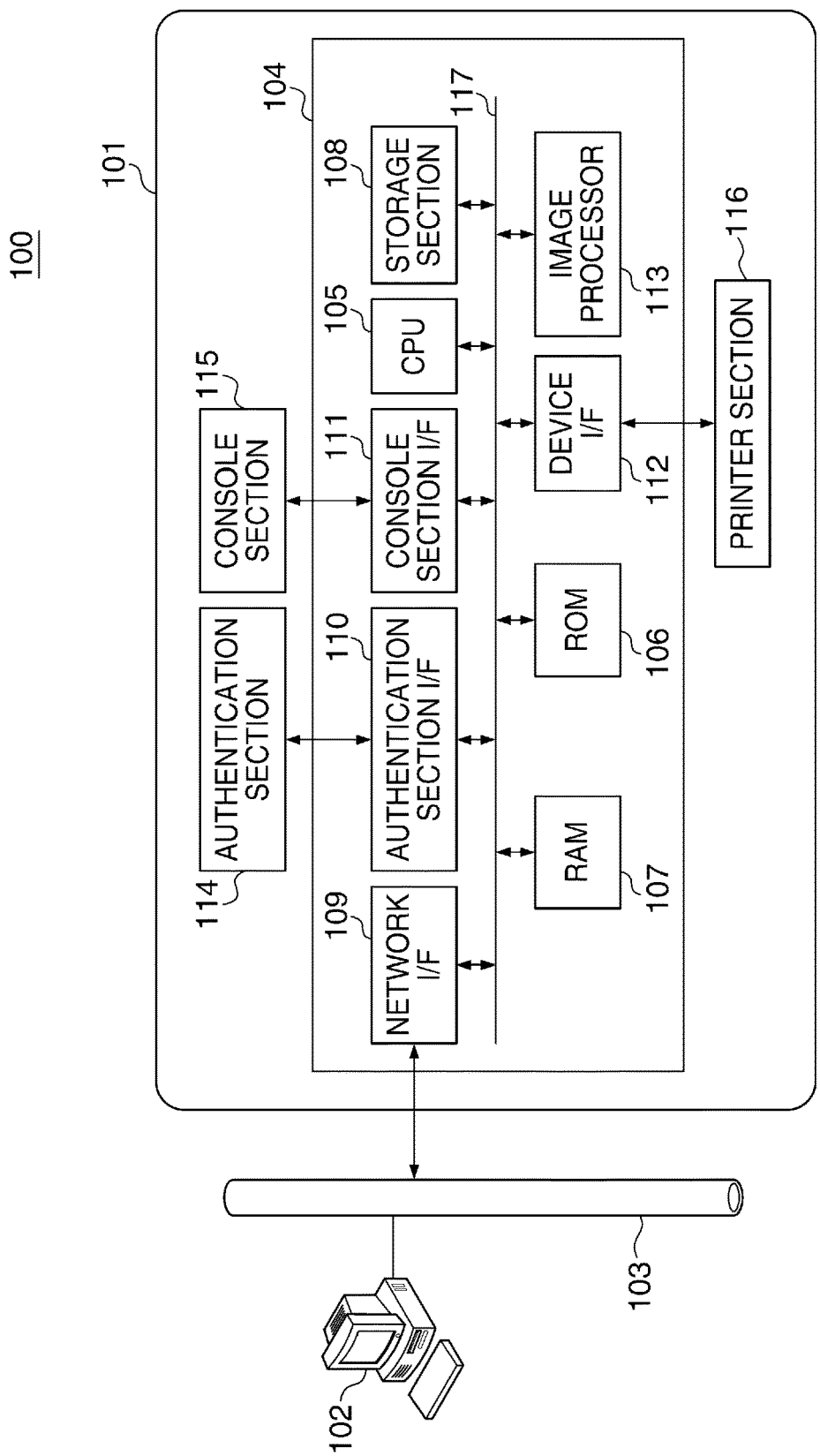
FIG. 1 is a schematic diagram of a printing system including an MFP as an image processing apparatus according to an embodiment of the present invention.

FIG. 1 is a schematic diagram of a printing system 100 including the MFP, denoted by reference numeral 101, as the image processing apparatus according to the embodiment of the present invention.

Referring to FIG. 1, the printing system 100 is comprised of the MFP 101 and a client PC 102, and the MFP 101 and the client PC 102 are connected to each other via a LAN 103. The MFP 101 is comprised of a controller 104, an authentication section 114, a console section 115, and a printer section 116, and the controller 104 is connected to the authentication section 114, the console section 115, and the printer section 116. The controller 104 includes a CPU 105, a ROM 106, a RAM 107, a storage section 108, a network interface 109, an authentication section interface 110, a console section interface 111, a device interface 112, and an image processor 113, as component elements. The component elements of the controller 104 are interconnected via a system bus 117.

In the printing system 100, the client PC 102 transmits print data to the MFP 101 via the LAN 103, and the MFP performs print processing based on the received print data. The MFP 101 is capable of performing scan processing, various kinds of print processing including normal printing and reservation printing, and so forth. When performing reservation printing, the MFP 101 generates a print data list 310, described hereinafter with reference to FIG. 3C, for managing received print data. Further, the MFP 101 is capable of performing print processing based on setting information input by an operation on the console section 115 by a user, which is different from setting information included in an acquired (received) print data item. The client PC 102 generates a print data item including various kinds of setting information set by the user, and transmits the generated print data item to the MFP 101.

The controller 104 of the MFP 101 controls the overall operation of the MFP 101. The CPU 105 performs various processes of software modules 200, described hereinafter with reference to FIG. 2, by executing various programs stored in the ROM 106. The ROM 106 stores various programs and various data, used by the CPU 105. The RAM 107 is used as a work area for the CPU 105, and is also used as an area for temporarily storing various data. The storage section 108 is a hard disk drive, and stores various programs and various data including image data and so forth. In the present embodiment, the storage section 108 stores the print data list 310, described hereinafter. The network interface 109 performs data communication with an apparatus connected to the LAN 103, such as the client PC 102. The authentication section interface 110 performs data communication with the authentication section 114, the console section interface 111 performs data communication with the console section 115, and the device interface 112 performs data communication with the printer section 116. The image processor 113 analyzes acquired print data item to thereby generate image data, and performs various kinds of processing, such as correction processing and resolution conversion processing, on the generated image data.

The authentication section 114 reads e.g. an IC card held by a user to thereby acquire authentication information used for user authentication, and sends the acquired authentication information to the controller 104. Upon receipt of the authentication information, the controller 104 performs user authentication using the received authentication information. The console section 115 includes at least one display that is capable of displaying various kinds of menus and various kinds of information, and various keys, none of which are shown. For example, the console section 115 displays a preview screen 505, described hereinafter with reference to FIG. 5B, based on the acquired print data item. Further, the console section 115 sends input information input by a user's operation on the console section 115 to the CPU 105 via the console section interface 111. The printer section 116 performs print processing based on the received print data.

Figure 2:
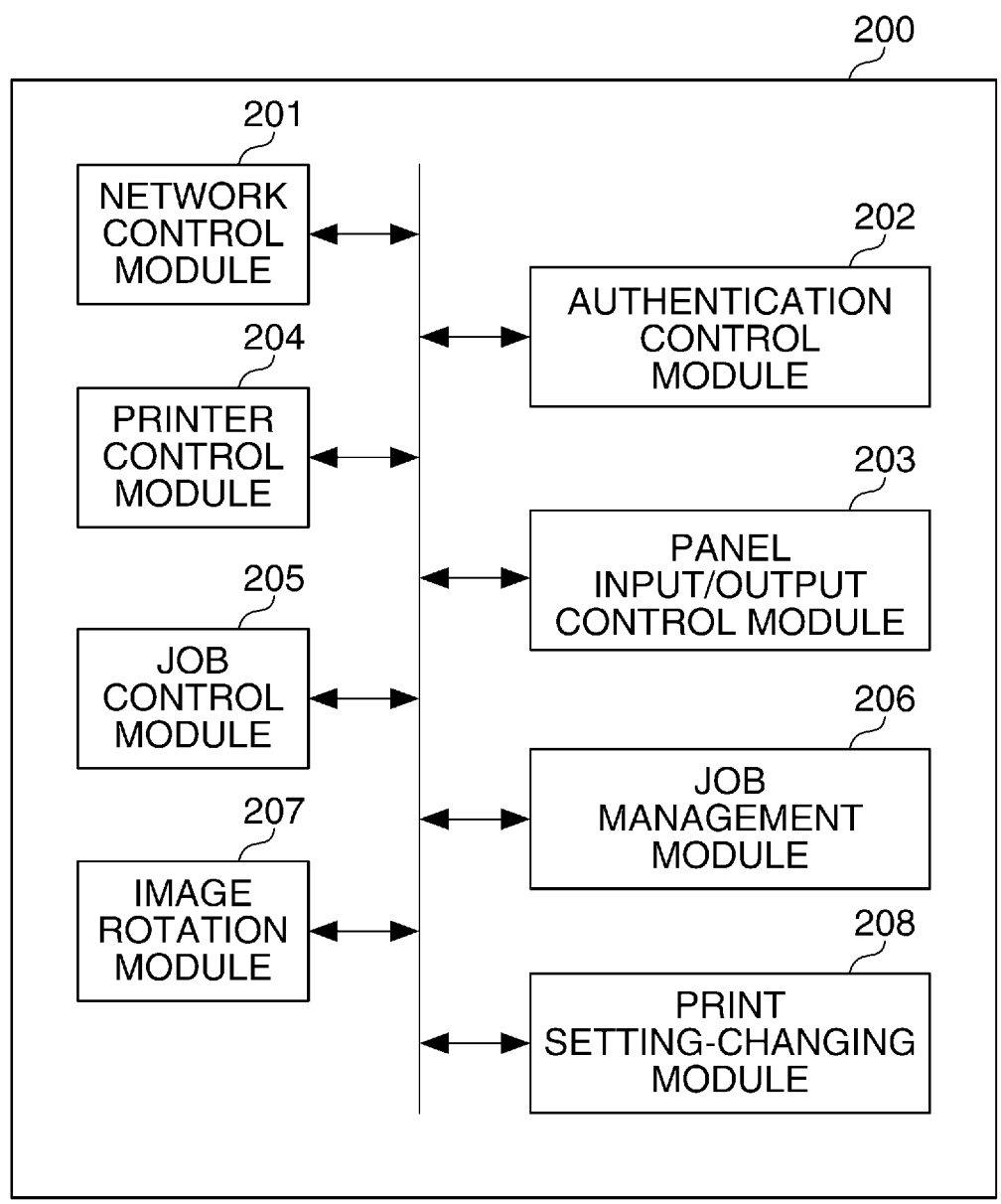
FIG. 2 is a schematic block diagram of software modules of the MFP appearing in FIG. 1.

FIG. 2 is a schematic block diagram of the software modules 200 of the MFP 101 appearing in FIG. 1.

Referring to FIG. 2, the software modules 200 include a network control module 201, an authentication control module 202, a panel input/output control module 203, a printer control module 204, and a job control module 205. Further, the software modules 200 include a job management module 206, an image rotation module 207, and a print setting-changing module 208. Various processes of the software modules 200 are performed by the CPU 105 that executes various programs stored in the ROM 106.

The network control module 201 sends a notification to the effect that the network interface 109 has received print data, to the printer control module 204. The authentication control module 202 performs user authentication based on authentication information acquired by the authentication section 114, and sends a notification indicative of a result of the user authentication to the printer control module 204. The panel input/output control module 203 sends a notification indicative of input information input by a user's operation on the console section 115, to the printer control module 204. The printer control module 204 controls the printer section 116 based on various notifications received from the network control module 201, the authentication control module 202, and the panel input/output control module 203. The job control module 205 analyzes a print data item received by the network interface 109 to thereby generate image data, and sends the generated image data to the printer section 116. The job management module 206 manages print data received by the network interface 109 according to users' instructions for transmission thereof, on a user-by-user basis. Further, upon receipt of a notification to the effect that user authentication is successful, the job management module 206 sends a notification indicative of a print data item associated with the authenticated user, to the printer control module 204 and the job control module 205, based on the received notification. The image rotation module 207 performs image processing on image data generated by the job control module 205 such that an image based on the image data is displayed after being rotated through 180 degrees. The print setting-changing module 208 changes setting information of the print data list 310, described hereinafter, based on input information input by a user's operation on the console section 115.

Figure 3A:
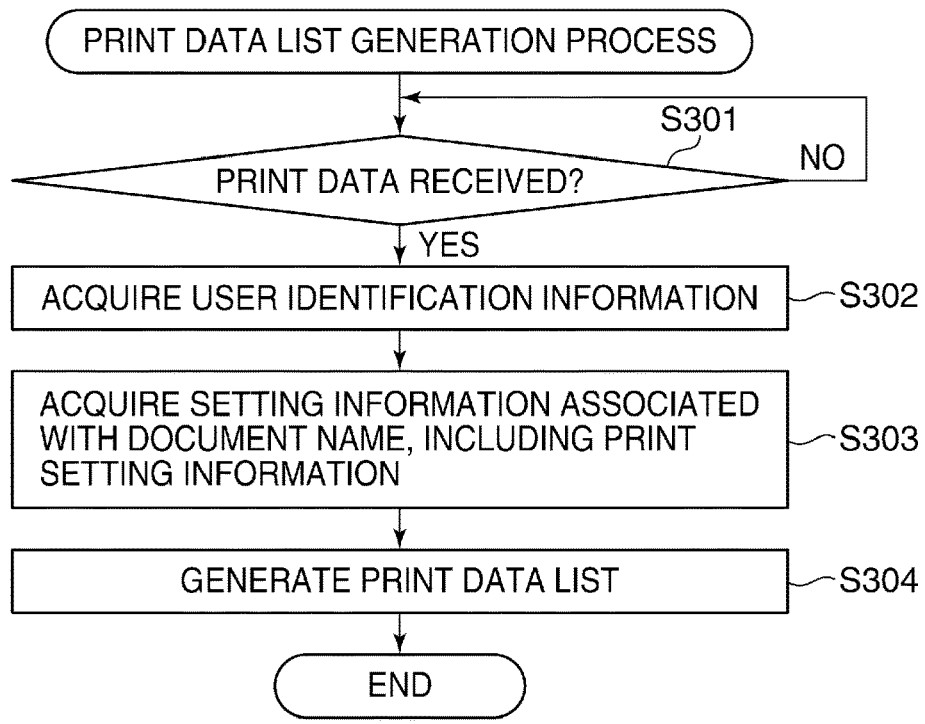
FIG. 3A is a flowchart of a print data list generation process performed by the MFP appearing in FIG. 1.
Figure 3B:
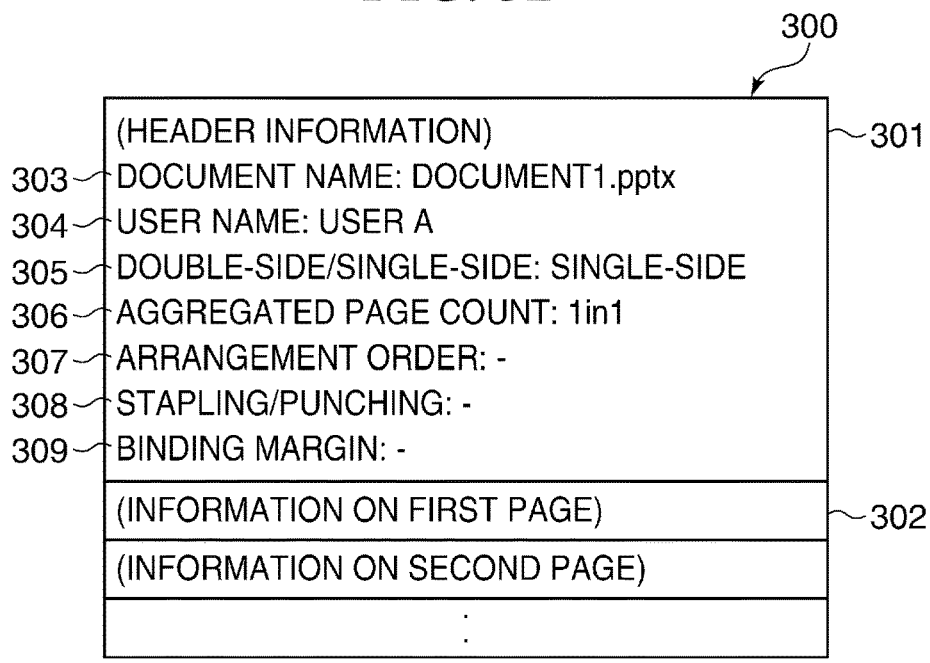
FIG. 3B is a diagram showing an example of print data used in the print data list generation process.

FIGS. 3A to 3C are diagrams useful in explaining a print data list generation process performed by the MFP 101 appearing in FIG. 1, in which FIG. 3A is a flowchart of the print data list generation process, FIG. 3B is a diagram showing an example of a print data item used in the print data list generation process, and FIG. 3C is a diagram showing an example of a print data list generated by the print data list generation process.

The print data list generation process in FIG. 3A is performed by the CPU 105 that executes the various programs stored in the ROM 106, on condition that reservation printing is performed.

Referring to FIG. 3A, first, the CPU 105 determines whether or not print data has been received e.g. from the client PC 102 (step S301), and waits until print data is received. Then, upon receipt of print data, such as a print data item 300 shown in FIG. 3B, from the client PC 102 (YES to the step S301), the CPU 105 acquires user identification information from the received print data item 300 (step S302). Although in the present embodiment, it is assumed that the user identification information is acquired from the received print data item, the user identification information may be directly acquired from the client PC 102. The print data item 300 includes header information 301 and page print contents 302. The header information 301 includes a document name 303, a user name 304, a double-side/single-side setting 305, an aggregated page count 306, an arrangement order 307, a stapling/punching setting 308, and a binding margin 309. The document name 303 indicates the name of a document file to be printed, and the user name 304 indicates user identification information that identifies a user who has instructed transmission of a print data item. The double-side/single-side setting 305 indicates setting information indicative of one of double-sided printing and single-sided printing, the aggregated page count 306 indicates information concerning Nin1 printing, and the arrangement order 307 indicates information concerning an arrangement order of print contents corresponding to the respective pages of printed matter to be obtained when Nin1 printing is performed. The stapling/punching setting 308 indicates information indicative of positions on a recording sheet, where stapling is to be performed, and information indicative of positions on a recording sheet, where punching is to be performed, and the binding margin 309 indicates an amount of binding margin from one end of a recording sheet to be printed. In the following description, setting information items set to the respective items of the double-side/single-side setting 305, the aggregated page count 306, the arrangement order 307, the stapling/punching setting 308, and the binding margin 309 are collectively defined as the print setting information. The page print content 302 is binary data which represents contents to be printed on each page. In the header information 301, there are set the setting information items corresponding to the respective items of the document name 303, the user name 304, the double-side/single-side setting 305, the aggregated page count 306, the arrangement order 307, the stapling/punching setting 308, and the binding margin 309. Further, in the header information 301, an item containing no setting information is set to "-", a blank space, or the like.

Then, the CPU 105 acquires the setting information associated with the document name 303, including the print setting information, from the received print data item 300 (step S303). Then, the CPU 105 generates the print data list 310 shown in FIG. 3C for managing print data items, based on the acquired user identification information, and the setting information associated with the document name 303, including the print setting information (step S304). The CPU 105 generates a print data list specific to each user corresponding to the user identification information. The print data list 310 includes a document name 311, a double-side/single-side setting 312, an aggregated page count 313, an arrangement order 314, a stapling/punching setting 315, and a binding margin 316, which correspond to the respective items of the document name 303 and the print setting information. In the following description, the setting information items set to the respective items of the arrangement order 314, the stapling/punching setting 315, and the binding margin 316 are collectively defined as the layout information. The layout information corresponds to information concerning a print position of print contents. The CPU 105 manages the layout information of each document file of the document name 311 based on the print data list 310, and performs reservation printing. In the present embodiment, the MFP 101 is capable of changing the various setting information set in the print data list 310, based on input information input by a user's operation on the console section 115, and is capable of performing print processing based on the changed setting information. Then, the CPU 105 stores the generated print data list 310 in the storage section 108. In the present embodiment, the storage section 108 stores a plurality of print data lists which are classified into print data lists of respective users. Then, the CPU 105 terminates the present process after storing the print data list 310 in the storage section 108.

Figure 4:
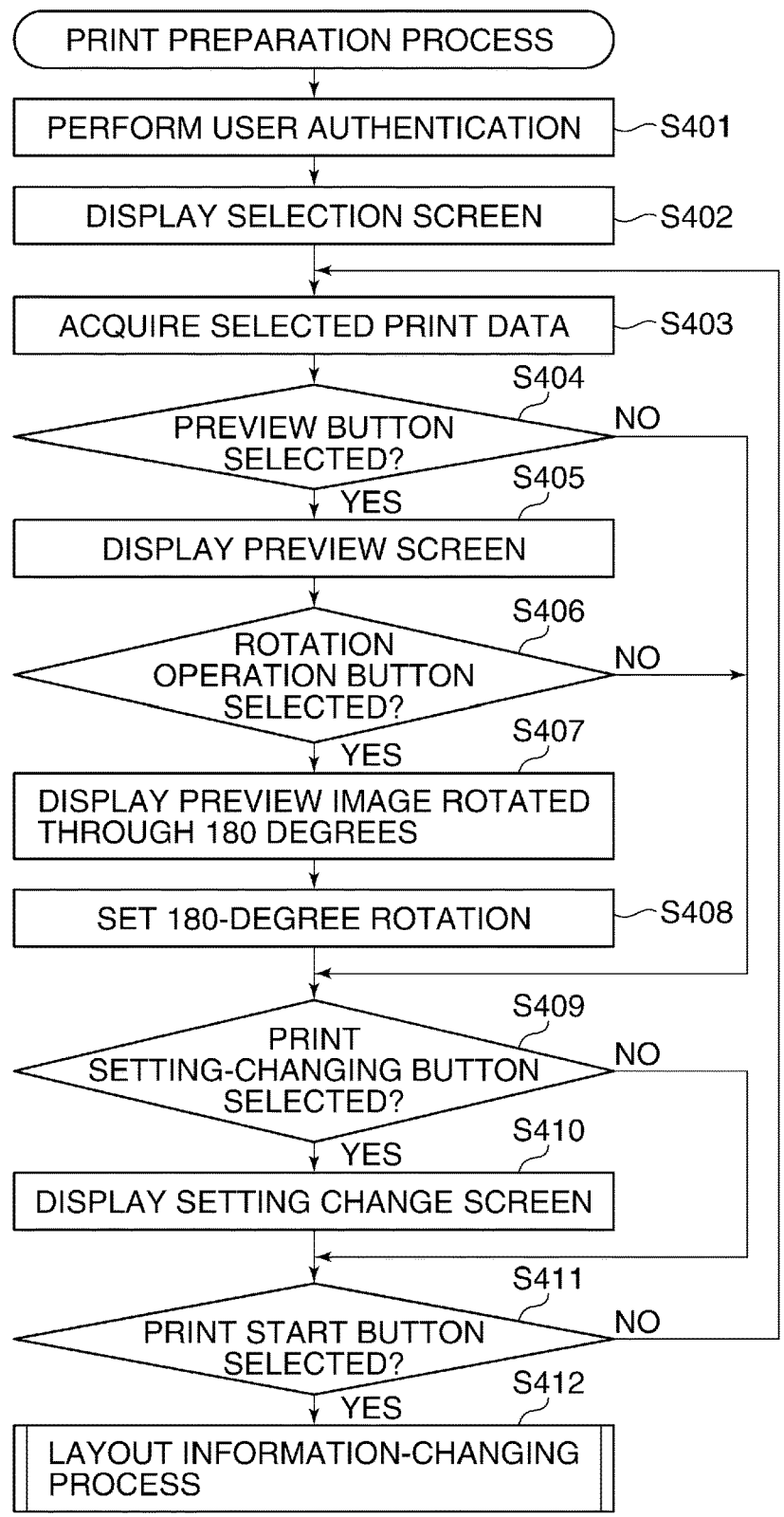
FIG. 4 is a flowchart of a print preparation process performed by the MFP appearing in FIG. 1.

FIG. 4 is a flowchart of a print preparation process performed by the MFP 101 appearing in FIG. 1.

The process in FIG. 4 is performed by the CPU 105 that executes the various programs stored in the ROM 106.

Referring to FIG. 4, first, when a user holds an ID card over the authentication section 114, the CPU 105 acquires the authentication information from the ID card, and performs user authentication using the acquired authentication information (step S401). Note that in the present embodiment, it is assumed, by way of example, that the authentication information is acquired from the ID card held over the authentication section 114, user authentication may be performed using authentication information input by a user's operation on the console section 115.

Figure 5A:
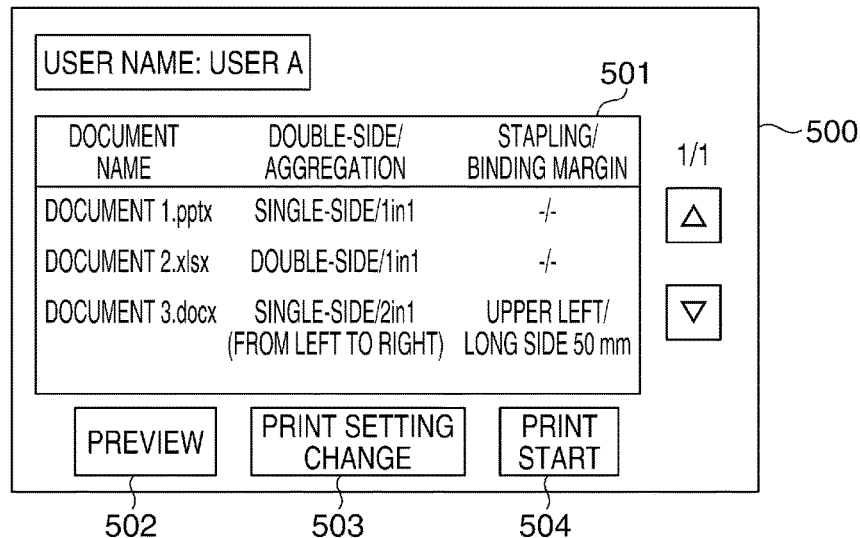
FIG. 5A is a diagram showing an example of a selection screen displayed on a console section appearing in FIG. 1.

Then, when user authentication is successful, the CPU 105 acquires the print data list 310 associated with the authenticated user out of the plurality of print data lists stored in the storage section 108. Then, the CPU 105 displays a selection screen 500 shown in FIG. 5A for prompting the user to select a print data item to be printed, on the console section 115, based on the acquired print data list 310 (step S402). The selection screen 500 includes a display section 501, a preview button 502, a print setting-changing button 503, and a print start button 504. The display section 501 displays the document name, the layout information, etc., of the print data item managed by the print data list 310. The preview button 502 is an operation button for displaying a preview screen of the print data item selected on the display section 501, and the print setting-changing button 503 is an operation button for changing various setting information of the print data list 310, which is associated with the print data item selected on the display section 501. The print start button 504 is an operation button for instructing the start of execution of print processing. When a user selects at least one print data item from a plurality of print data items displayed on the display section 501, and selects one of the above-mentioned operation buttons, the CPU 105 performs processing corresponding to the selected operation button.

Then, when at least one print data item is selected by the user from the plurality of print data items displayed on the display section 501, the CPU 105 acquires the selected print data item (hereinafter referred to as the "selected print data item") (step S403). Then, the CPU 105 determines whether or not the preview button 502 has been selected (step S404).

If it is determined in the step S404 that the preview button 502 has not been selected, the CPU 105 executes a step S409, described hereinafter. On the other hand, if the preview button 502 has been selected, the CPU 105 displays the preview screen 505 shown in FIG. 5B on the console section 115 based on the acquired print data item (step S405). The preview screen 505 includes a preview display section 506, a rotation operation button 507, and an OK button 508. The preview display section 506 displays a preview image based on the print data item. The rotation operation button 507 is an operation button for causing the preview image displayed on the preview display section 506 to be rotated through 180 degrees and causing the rotated image to be displayed, and the OK button 508 is an operation button for switching the preview screen 505 to the selection screen 500. Although in the present embodiment, the rotation operation button 507 is displayed on the preview screen 505, by way of example, the rotation operation button 507 is not limitedly displayed on the preview screen 505. For example, the rotation operation button 507 may be displayed on an operation screen which is different from the preview screen 505 and is displayed for a user to configure various settings of the preview screen 505. Further, the rotation operation button 507 may be provided on the console section 115 as a key button. Then, the CPU 105 determines whether or not the rotation operation button 507 has been selected (step S406).

Figure 5B:
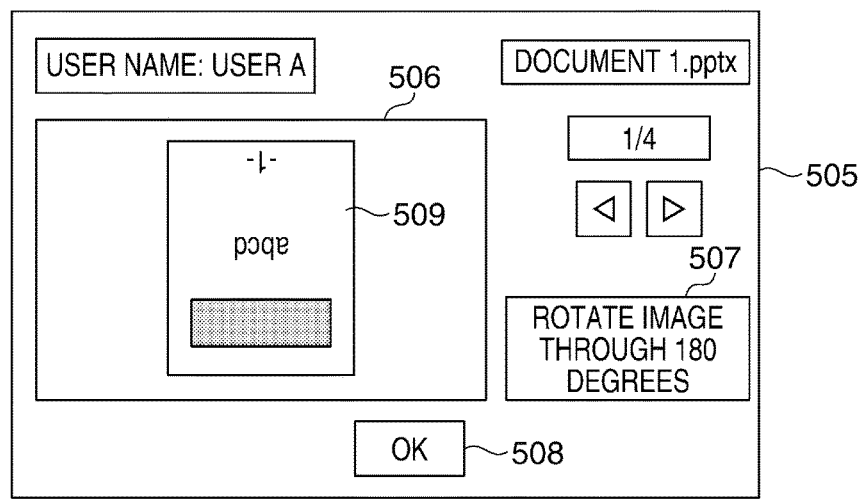
FIG. 5B is a diagram showing an example of a preview screen displayed on the console section.
Figure 5C:
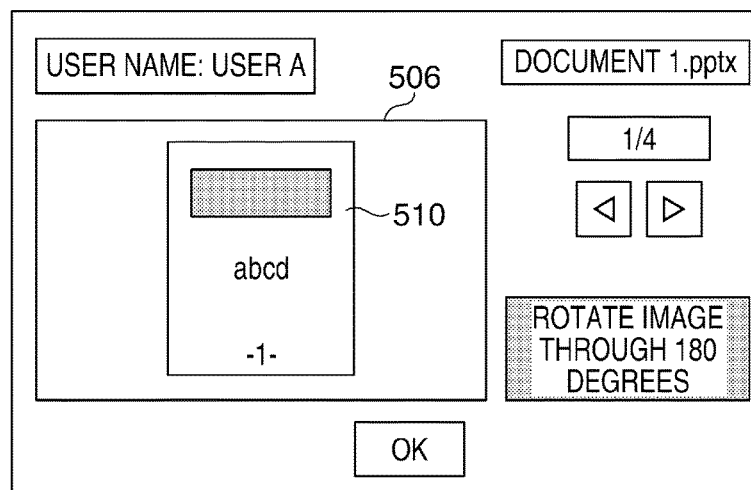
FIG. 5C is a diagram showing a case where a rotation operation button is selected on the preview screen.
Figure 7A:
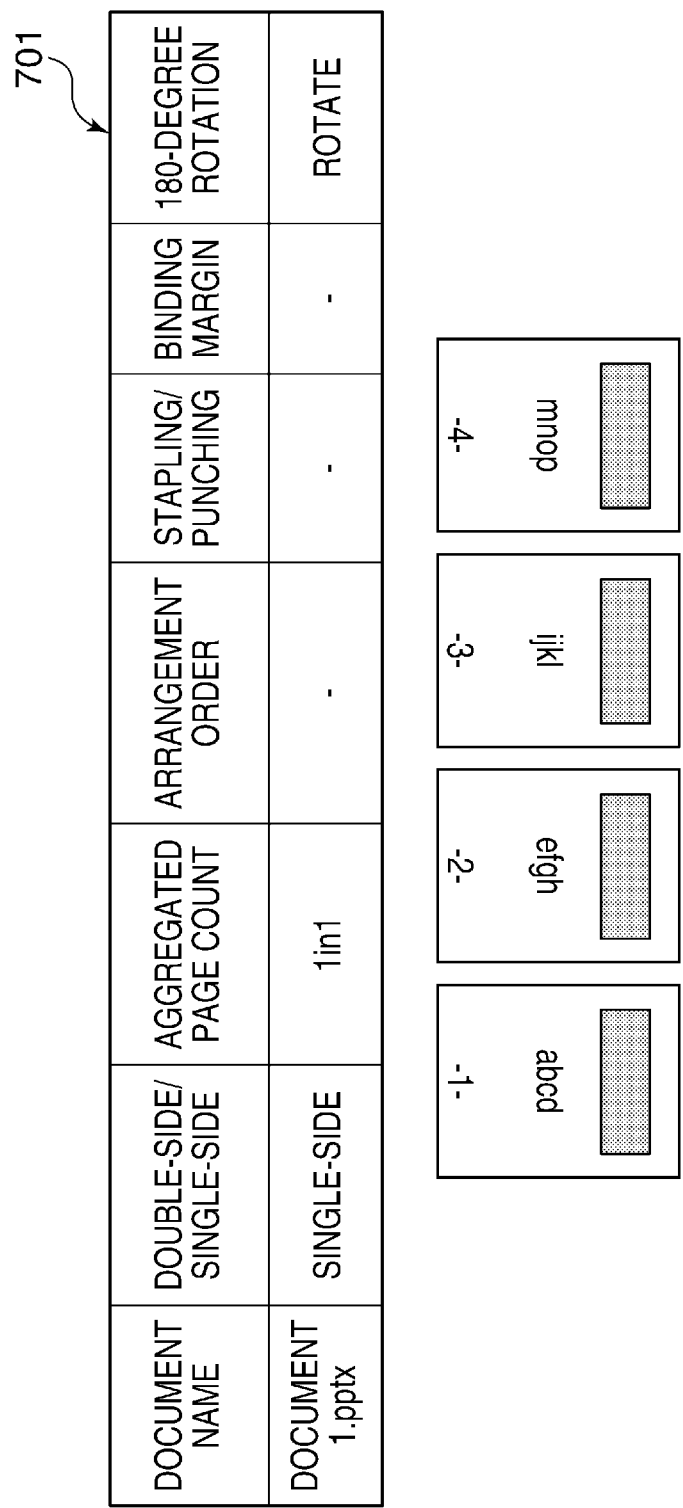
FIG. 7A is a diagram useful in explaining a change of layout information of the print data list shown in FIG. 3C in a case where 180-degree rotation is set.

If it is determined in the step S406 that the rotation operation button 507 has not been selected, the CPU 105 executes the step S409, described hereinafter. On the other hand, if it is determined in the step S406 that the rotation operation button 507 has been selected, the CPU 105 rotates the preview image displayed on the preview display section 506 through 180 degrees, and displays the rotated preview image on the preview display section 506 (step S407). For example, in a case where a preview image 509 shown in FIG. 5B is displayed on the preview display section 506, when the user selects the rotation operation button 507, the CPU 105 displays a preview image 510 shown in FIG. 5C on the preview display section 506. Then, the CPU 105 adds a box of 180-degree rotation 701 indicating whether or not to perform 180-degree rotation print processing to the print data list 310, and sets therein "rotate" indicating execution of 180-degree rotation print processing, as shown in FIG. 7A, referred to hereinafter (step S408). Then, the CPU 105 determines whether or not the print setting-changing button 503 has been selected (step S409).

If it is determined in the step S409 that the print setting-changing button 503 has not been selected, the CPU 105 executes a step S411, described hereinafter. On the other hand, if it is determined in the step S409 that the print setting-changing button 503 has been selected, the CPU 105 displays a setting change screen, not shown, for changing the various setting information of the print data list 310 on the console section 115 (step S410). The user can change the setting information set to the respective items of the double-side/single-side setting 312, the aggregated page count 313, the arrangement order 314, the stapling/punching setting 315, and the binding margin 316 of the print data list 310 using the setting change screen. Each setting information item in the print data list 310 stored in the storage section 108 is changed based on the setting information set by the user using the setting change screen. Then, the CPU 105 determines whether or not the print start button 504 has been selected (step S411).

If it is determined in the step S411 that the print start button 504 has not been selected, the CPU 105 returns to the step S403. On the other hand, if it is determined in the step S411 that the print start button 504 has been selected, the CPU 105 performs a layout information-changing process described hereinafter with reference to FIG. 6 (step S412), and performs 180-degree rotation print processing.

That is, in the present embodiment, execution of 180-degree rotation print processing is set according to selection of the rotation operation button 507 on the preview screen 505.

Figure 6:
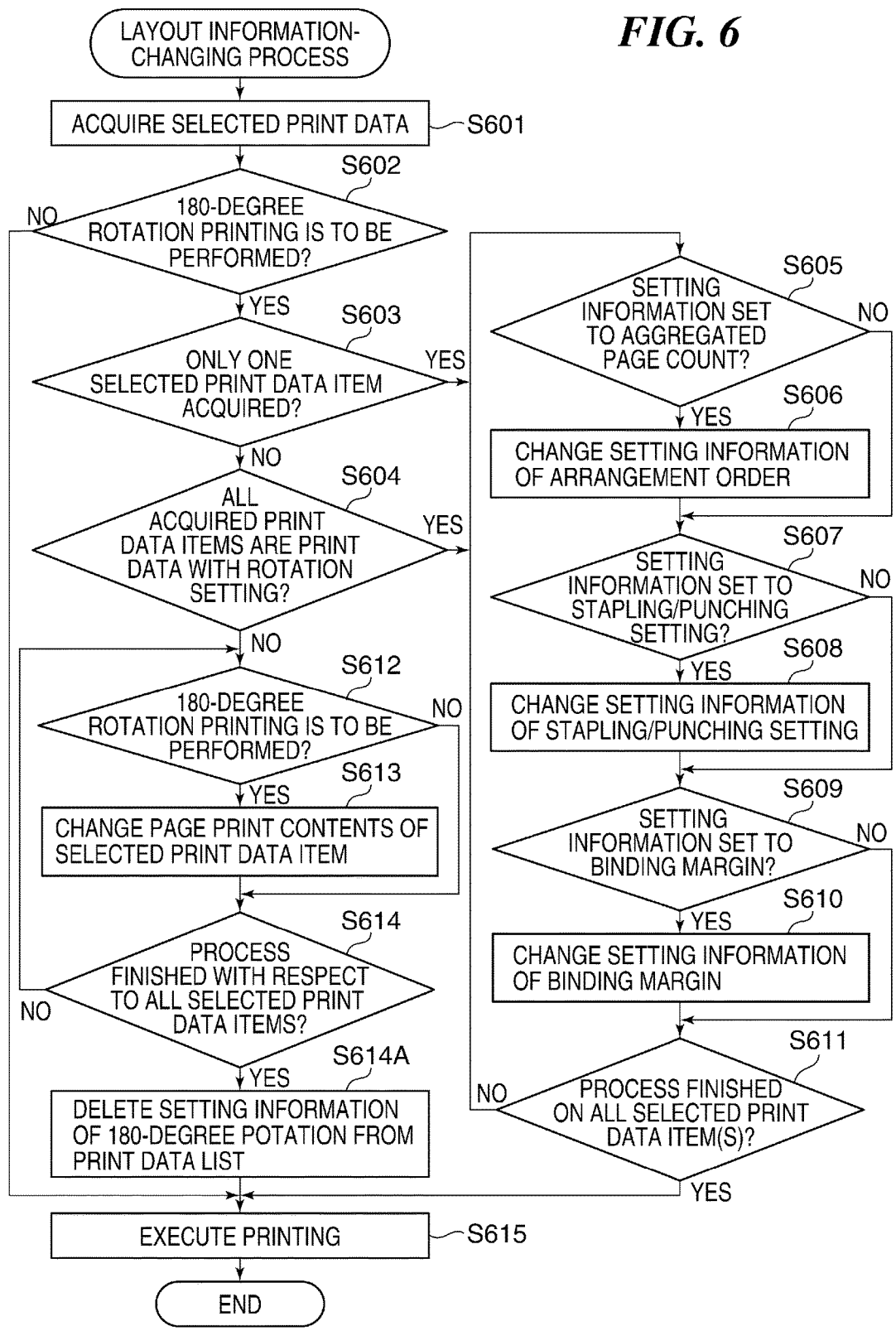
FIG. 6 is a flowchart of a layout information-changing process performed in a step of the print preparation process in FIG. 4.

FIG. 6 is a flowchart of the layout information-changing process performed in the step S412 in FIG. 4.

The process in FIG. 6 is performed by the CPU 105 that executes the various programs stored in the ROM 106 according to user's selection of the rotation operation button 507 on the preview screen 505.

Referring to FIG. 6, first, the CPU 105 acquires print data selected when the print start button 504 has been selected (step S601), and determines whether or not to perform 180-degree rotation print processing (step S602). In the step S602, if at least one selected print data item of which 180-degree rotation 701 in the print data list 310 is set to "rotate" (hereinafter, such print data is referred to as "print data with rotation setting"), as shown in FIG. 7A, is acquired in the step S601, the CPU 105 determines to perform 180-degree rotation print processing. On the other hand, if only selected print data of which 180-degree rotation 701 in the print data list 310 is not set to "rotate" (hereinafter, such print data is referred to as "print data without rotation setting") is acquired in the step S601, the CPU 105 determines not to perform 180-degree rotation print processing.

If it is determined in the step S602 that 180-degree rotation print processing is not to be performed, the CPU 105 executes a step S615, described hereinafter. On the other hand, if it is determined in the step S602 that 180-degree rotation print processing is to be performed, the CPU 105 determines whether or not only one selected print data item has been acquired in the step S601 (step S603).

If it is determined in the step S603 that only one selected print data item has been acquired, the CPU 105 executes a step S605, described hereinafter. On the other hand, if it is determined in the step S603 that a plurality selected print data items have been acquired, the CPU 105 determines whether or not all the acquired selected print data items are print data with rotation setting (step S604).

If it is determined in the step S604 that all the acquired selected print data items are print data with rotation setting, the CPU 105 proceeds to the step S605, wherein the CPU 105 determines whether or not setting information is set to the aggregated page count 313 of the selected print data item in the print data list 310 (step S605).

Figure 7B:
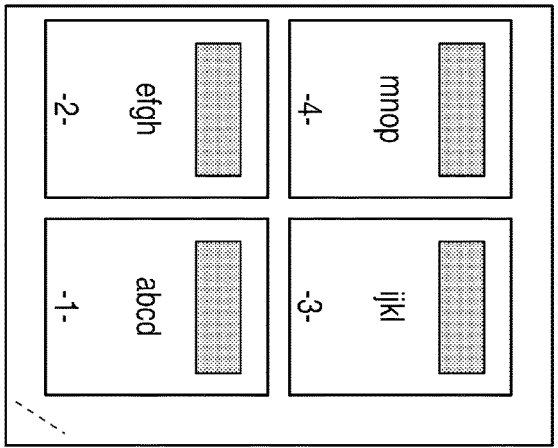
FIG. 7B is a diagram showing an example of the print data list before changing the layout information.

If it is determined in the step S605 that setting information is not set to the aggregated page count 313 of the selected print data item, the CPU 105 executes a step S607, described hereinafter. On the other hand, if it is determined in the step S605 that setting information is set to the aggregated page count 313 of the selected print data item, the CPU 105 changes setting information of the arrangement order 314 of the selected print data item in the print data list 310 (step S606). For example, the CPU 105 changes the setting information of the arrangement order 314 in the print data list 310 from "from upper left to right" in FIG. 7B to "from lower right to left" in FIG. 7C, which is a reverse order of the order "from upper left to right". Then, the CPU 105 determines whether or not setting information is set to the stapling/punching setting 315 of the selected print data item in the print data list 310 (step S607).

If it is determined in the step S607 that setting information is not set to the stapling/punching setting 315 of the selected print data item, the CPU 105 executes a step S609, described hereinafter. On the other hand, if it is determined in the step S607 that setting information is set to the stapling/punching setting 315 of the selected print data item, the CPU 105 changes the setting information of the stapling/punching setting 315 of the selected print data item in the print data list 310 (step S608). For example, the CPU 105 changes the setting information of the stapling/punching setting 315 set in the print data list 310 from "upper left" in FIG. 7B to "lower right" in FIG. 7C, which is a position opposite to the "upper left" with respect to the center of the recording sheet. Then, the CPU 105 determines whether or not setting information is set to the binding margin 316 of the selected print data item on the print data list 310 (step S609).

If it is determined in the step S609 that setting information is not set to the binding margin 316 of the selected print data item, the CPU 105 executes a step S611, described hereinafter. On the other hand, if it is determined in the step S609 that setting information is set to the binding margin 316 of the selected print data item, the CPU 105 changes the setting information of the binding margin 316 of the selected print data item in the print data list 310 (step S610). For example, the CPU 105 changes the setting information of the binding margin 316 in the print data list 310 from "long side 50 mm" in FIG. 7B to "long side −50 mm" in FIG. 7C. The setting information of "long side 50 mm" of the binding margin 316 indicates that an amount of the binding margin from one end of the long side of the recording sheet is 50 mm, and "long side −50 mm" of the binding margin 316 indicates that an amount of the binding margin from the other end opposite to the one end with respect to the center of the recording sheet is 50 mm. By changing the setting information as above, the layout information of the selected print data item in the print data list 310 is changed to layout information adapted to processing for printing the print contents after rotating the same through 180 degrees. Then, the CPU 105 determines whether or not the process has been finished with respect to all of the selected print data item(s) (step S611).

If it is determined in the step S611 that the process has not been finished with respect to all of the selected print data items, the CPU 105 returns to the step S605 so as to perform the process on the remainder of the selected print data. On the other hand, if it is determined in the step S611 that the process has been finished with respect to all of the selected print data item(s), the CPU 105 executes the step S615, described hereinafter.

If it is determined in the step S604 that all the acquired selected print data items are not print data with rotation setting, i.e. print data without rotation setting is included in the acquired selected print data item, the CPU 105 determines with respect to each of all the acquired selected print data items whether or not to perform 180-degree rotation print processing (step S612). In the step S612, if a selected print data item is print data with rotation setting, the CPU 105 determines to perform 180-degree rotation print processing for the selected print data item, whereas if a selected print data item is print data without rotation setting, the CPU 105 determines not to perform 180-degree rotation print processing for the selected print data item.

Figure 9A:
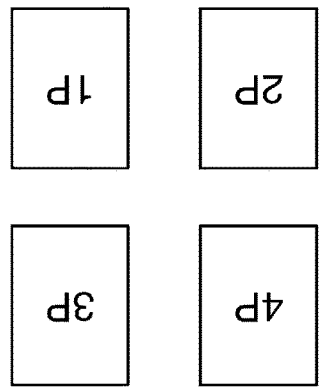
FIGS. 9A to 9C are diagrams useful in explaining a problem caused when printed matter is generated by the conventional Nin1 print processing.
Figure 9B:
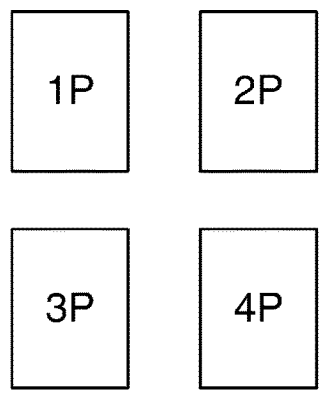
Figure 9C:
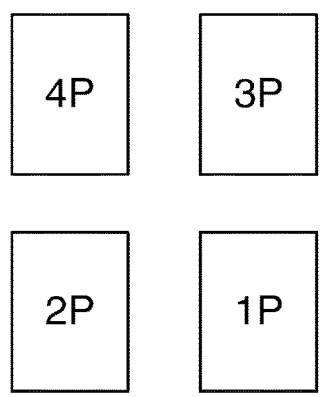

If it is determined in the step S612 that 180-degree rotation print processing is not to be performed, the CPU 105 executes a step S614, described hereinafter. On the other hand, if it is determined in the step S612 that 180-degree rotation print processing is to be performed, the CPU 105 changes the page print contents 302 of the selected print data item to page print contents adapted to 180-degree rotation print processing (step S613). For example, the CPU 105 changes the page print contents 302 in such a manner that the print contents of the respective pages of printed matter to be printed as shown in FIG. 9A are rotated through 180 degrees as shown in FIG. 9B without changing a print position of the print contents of each page. This makes it possible to prevent printed matter shown in FIG. 9C, which is not desired by the user, from being generated as in the case of the prior art. Then, the CPU 105 determines whether or not the process has been finished with respect to all the selected print data items (step S614).

If it is determined in the step S614 that the process has not been finished with respect to all the selected print data items, i.e. has not been finished with respect to any of them, the CPU 105 returns to the step S612 so as to perform the process on the remainder of the selected print data items. On the other hand, if it is determined in the step S614 that the process has been finished with respect to all the selected print data items, the CPU 105 deletes the setting information of 180-degree rotation 701 from the print data list 310 (step S614A), as shown in FIG. 7C. Then, the CPU 105 proceeds to the step S615, wherein the CPU 105 performs print processing based on the print data list 310, followed by terminating the present process.

According to the above-described processes in FIGS. 3A, 4, and 6, if it is determined to perform 180-degree rotation print processing, the layout information of the selected print data item in the print data list 310 is changed to the layout information adapted to processing for printing the print contents after rotating the same through 180 degrees. This makes it possible to obtain printed matter including the print contents which are printed at proper print positions after being rotated through 180 degrees, i.e. printed matter having the print contents printed at positions matching the print positions desired by a user. As a result, it is possible to generate printed matter desired by the user.

Further, in the above-described processes in FIGS. 3A, 4, and 6, it is determined whether or not to perform 180-degree rotation print processing according to the operation of the rotation operation button 507. This makes it unnecessary for a user to make special settings for printing print contents after rotating the same through 180 degrees, whereby it is possible to improve the convenience of a user.

Further, in the above-described processes in FIGS. 3A, 4, and 6, the layout information includes the setting information of the arrangement order 314, the setting information of the stapling/punching setting 315, and the setting information of the binding margin 316. Therefore, only by using the layout information, it is possible to realize the arrangement order of the print contents, positions on a recording sheet where stapling is performed, positions on a recording sheet where punching is performed, and an amount of binding margin from one end of the recording sheet, which are adapted to printing of print contents to be performed after rotating the same through 180 degrees. As a result, it is possible to generate printed matter desired by a user without generating new print data again, whereby it is possible to improve the speed of execution of print processing.

In the above-described processes in FIGS. 3A, 4, and 6, if it is determined to perform 180-degree rotation print processing, the arrangement order of the print contents corresponding to the respective pages in the layout information is changed to a reverse order. Further, positions on a recording sheet where stapling is performed and/or positions on a recording where punching is performed in the layout information are changed to respective opposite positions with respect to the center of the recording sheet. Further, an amount of binding margin from one end of a recording sheet in the layout information is changed to an amount of binding margin from the other end which is opposite to the one end with respect to the center of the recording sheet. This makes it possible to prevent an unnatural printed matter from being generated even when print contents of print data are rotated through 180 degrees.

Further, in the above-described processes in FIGS. 3A, 4, and 6, if a plurality of selected print data items are acquired, it is determined whether or not to perform 180-degree rotation print processing with respect to each of all the acquired items of selected print data. By performing this determination, even when a plurality of selected print data items which are different in the setting of 180-degree rotation 701 are acquired at a time, it is possible to output printed matter having print contents according to the setting of the 180-degree rotation 701 of each selected print data item.

Although in the present embodiment, the description is given of the case where the present invention is applied to the MFP that is capable of communicating print data, the present invention is not limitedly applied to the MFP. For example, the present invention can be applied to image processing apparatuses that are capable of generating print data, including a client PC, a DFE (Digital Front End), and a mobile terminal.

In this case, after the image processing apparatus, for example, the client PC 102 generates the print data item 300, the client PC 102 displays the preview screen 505 shown in FIG. 5B on a console section, not shown, of the client PC 102 based on the generated print data item 300. Then, when a user selects the rotation operation button 507, the client PC 102 determines to perform 180-degree rotation print processing according to selection of the rotation operation button 507, as in the step S602 in FIG. 6. Then, if the setting information of the aggregated page count 306 is set in the print data item 300, the client PC 102 changes the setting information of the arrangement order 307 in the print data item 300 as in the step S606. Further, if the setting information of the stapling/punching setting 308 is set in the print data item 300, the client PC 102 changes the setting information of the stapling/punching setting 308 in the print data item 300 as in the step S608. Further, if the setting information of the binding margin 309 is set in the print data item 300, the client PC 102 changes the setting information of the binding margin 309 in the print data item 300 as in the step S610. Thus, the client PC 102 can generate the print data item 300 again by performing necessary minimum changing processing for changing only the header information 301. As a result, it is possible to obtain the same advantageous effects as provided by the above-described processes in FIGS. 3A, 4, and 6.

Further, in the present embodiment, the page print contents 302 of the print data item 300 may be changed to the page print contents 302 adapted to 180-degree rotation print processing according to the operation of the rotation operation button 507, irrespective of the number of acquired selected print data items.

Here, if setting information associated with a special use is set in the layout information of the print data list 310, there is a case where printed matter desired by a user cannot be generated only by changing the setting information as in the steps S606, S608, and S610.

To cope with this, according to a variation of the present embodiment, the page print contents 302 of the print data item 300 are changed to page print contents 302 adapted to 180-degree rotation print processing according to the operation of the rotation operation button 507.

Figure 8:
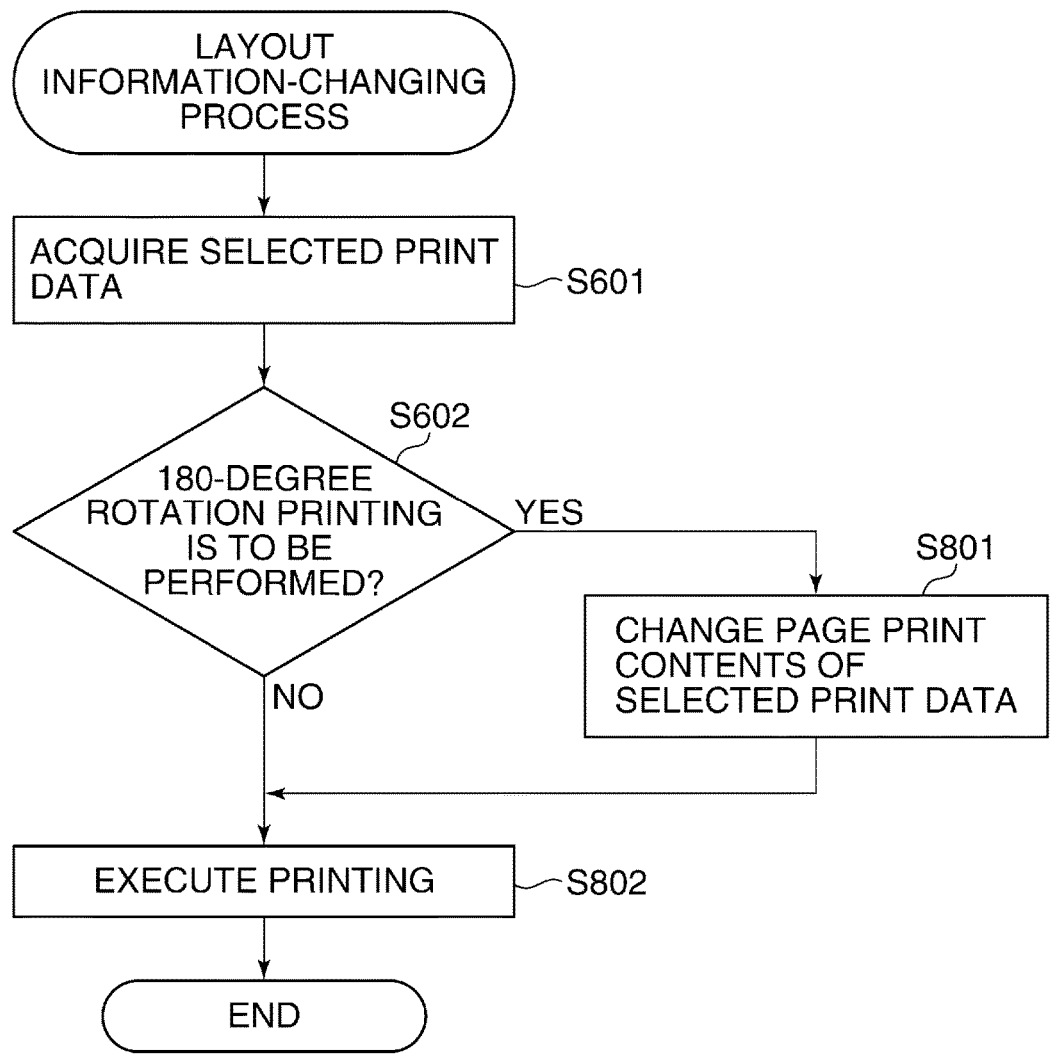
FIG. 8 is a flowchart of a variation of the layout information-changing process in FIG. 6.

FIG. 8 is a flowchart of a variation of the layout information-changing process in FIG. 6, which is performed in the variation of the embodiment.

The process in FIG. 8 is performed by the CPU 105 that executes the various programs stored in the ROM 106.

Referring to FIG. 8, first, the CPU 105 performs the same processing as in the steps S601 and S602 in FIG. 6.

If it is determined in the step S602 that 180-degree rotation print processing is not to be performed, the CPU 105 executes a step S802, described hereinafter. On the other hand, if it is determined in the step S602 that 180-degree rotation print processing is to be performed, the CPU 105 changes the page print contents 302 of the selected print data item (step S801). For example, the CPU 105 changes the page print contents 302 such that each of the print contents of pages to be printed as printed matter shown in FIG. 9A is rotated through 180 degrees as shown in FIG. 9B without changing a print position of the print contents of each page. As a consequence, even when the setting information associated with a special use is set, the CPU 105 can generate printed matter including the print contents which are printed at proper print positions after being rotated through 180 degrees without requiring a user to make special settings for printing the print contents after rotating the same through 180 degrees. Then, the CPU 105 performs print processing based on the changed selected print data (step S802), followed by terminating the present process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-182803, filed Sep. 16, 2015 and No. 2016-053814, filed Mar. 17, 2016 which are hereby incorporated by reference wherein in their entirety.

What is claimed is:

1. An image processing apparatus comprising:
   one or more controllers having a circuit configured to execute programs or a circuit implementing functions, the one or more controllers being configured to function as:
   an acquisition unit configured to acquire print data including a plurality of pages;
   a first determination unit configured to determine whether all of the plurality of pages included in the acquired print data are designated to be rotated through 180 degrees;
   a second determination unit configured to determine whether two or more pages of the plurality of pages included in the acquired print data are designated to be aggregated in a predetermined arrangement; and
   an output unit configured to output, based on a determination that all of the plurality of pages included in the acquired print data are designated to be rotated through 180 degrees and a determination that two or more pages of the plurality of pages included in the acquired print data are designated to be aggregated in the predetermined arrangement, an image in which all of the plurality of pages are not rotated through 180 degrees and are aggregated in an arrangement different from the predetermined arrangement.

2. The image processing apparatus according to claim 1, wherein the predetermined arrangement is an arrangement in which the two or more pages are arranged in an order of the two or more pages, and the different arrangement is an arrangement in which the two or more pages are arranged in a reverse order to the order of the two or more pages.

3. The image processing apparatus according to claim 1, wherein the one or more controllers are further configured to function as a reception unit configured to receive an instruction from a user, and
   wherein the one or more controllers acquire, based on an instruction for rotation of pages, which is received by the reception unit, information for designating pages to be rotated through 180 degrees.

4. The image processing apparatus according to claim 3, further comprising a display configured to display a preview image based on the acquired print data, and
   wherein the reception unit acquires the instruction for rotation for the preview image being displayed by the display.

5. The image processing apparatus according to claim 4, wherein the one or more controllers are further configured to perform post processing based on post-processing information included in the acquired print data, and
   wherein in a case where the plurality pages included in the acquired print data include no page to be rotated through 180 degrees, the one or more controllers perform the post processing toward one of four sides of a sheet, which is designated by the post-processing information, whereas in a case where all of the plurality pages included in the acquired print data are designated to be rotated through 180 degrees, the one or more controllers perform the post processing toward an opposite side to the one of the four sides of the sheet, which is designated by the post-processing information.

6. The image processing apparatus according to claim 5, wherein the post processing is stapling.

7. The image processing apparatus according to claim 5, wherein the post processing is punching.

8. The image processing apparatus according to claim 1, wherein the one or more controllers are further configured to generate image data of an image having a binding margin based on binding margin information included in the acquired print data, and
   wherein in a case where the plurality pages included in the acquired print data include no page to be rotated through 180 degrees, the one or more controllers provide the binding margin toward one of four sides of a sheet, which is designated by the binding information, whereas in a case where all of the plurality pages included in the acquired print data are designated to be rotated through 180 degrees, the one or more controllers provide the binding margin toward an opposite side to the one of the four sides of the sheet, which is designated by the binding information.

9. A method of controlling an image processing apparatus, the method comprising:
acquiring print data including a plurality of pages;
determining whether all of the plurality of pages included in the acquired print data are designated to be rotated through 180 degrees;
determining whether two or more pages of the plurality of pages included in the acquired print data are designated to be aggregated in a predetermined arrangement; and
outputting, based on a determination that all of the plurality of pages included in the acquired print data are designated to be rotated through 180 degrees and a determination that two or more pages of the plurality of pages included in the acquired print data are designated to be aggregated in the predetermined arrangement, an image in which all of the plurality of pages are not rotated through 180 degrees and are aggregated in an arrangement different from the predetermined arrangement.

10. The method according to claim 9, wherein the predetermined arrangement is an arrangement in which the two or more pages are arranged in an order of the two or more pages, and the different arrangement is an arrangement in which the two or more pages are arranged in a reverse order to the order of the two or more pages.

11. The method according to claim 9, further comprising:
receiving an instruction for rotation from a user; and
acquiring, based on the received instruction for rotation, information for designating pages to be rotated through 180 degrees.

12. The method according to claim 11, further comprising displaying a preview image based on the acquired print data,
wherein the instruction for rotation is received for the displayed preview image.

13. The method according to claim 12, further comprising performing post processing based on post-processing information included in the acquired print data,
wherein in a case where the plurality pages included in the acquired print data include no page to be rotated through 180 degrees, the post processing is performed toward one of four sides of a sheet, which is designated by the post-processing information, whereas in a case where all of the plurality pages included in the acquired print data are designated to be rotated through 180 degrees, the post processing is performed toward an opposite side to the one of the four sides of the sheet, which is designated by the post-processing information.

14. The method according to claim 13, wherein the post processing is stapling.

15. The method according to claim 13, wherein the post processing is punching.

16. The method according to claim 9, further comprising generating image data of an image having a binding margin based on binding margin information included in the acquired print data,
wherein in a case where the plurality pages included in the acquired print data include no page to be rotated through 180 degrees, the binding margin is provided toward one of four sides of a sheet, which is designated by the binding information, whereas in a case where all of the plurality pages included in the acquired print data are designated to be rotated through 180 degrees, the binding margin is provided toward an opposite side to the one of the four sides of the sheet, which is designated by the binding information.

17. The image processing apparatus according to claim 1, wherein the second determination unit is configured to determine whether two or more pages of the plurality of pages included in the acquired print data are designated to be aggregated in a predetermined arrangement only if the first determination unit determines that all of the plurality of pages included in the acquired print data are designated to be rotated through 180 degrees.

* * * * *